May 26, 1953 W. E. HUNT 2,639,775
ROTATIVE WING AIRCRAFT
Filed Aug. 14, 1946 3 Sheets-Sheet 1
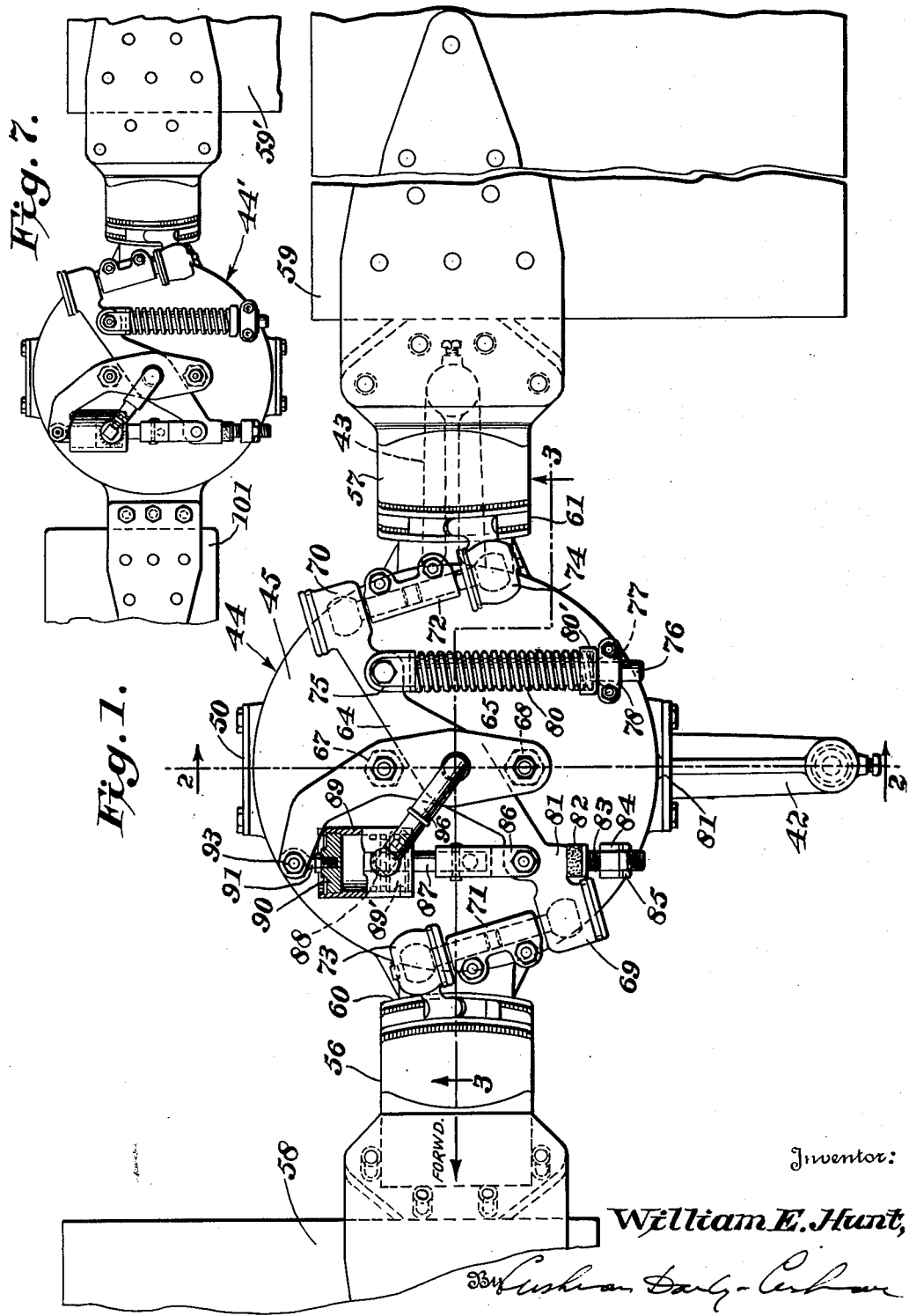
Inventor:
William E. Hunt,
By Cushman Darby Cushman
Attorneys.

May 26, 1953 W. E. HUNT 2,639,775
ROTATIVE WING AIRCRAFT
Filed Aug. 14, 1946 3 Sheets-Sheet 2
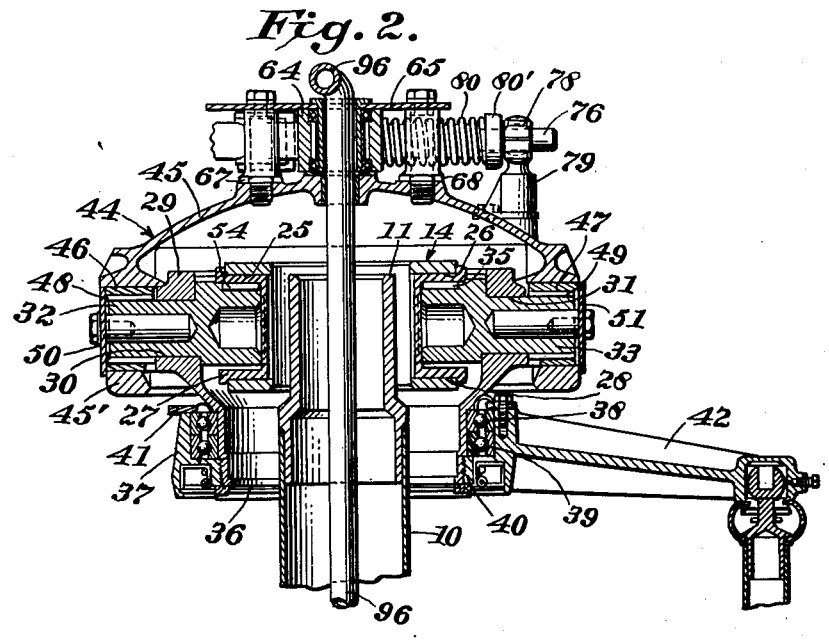
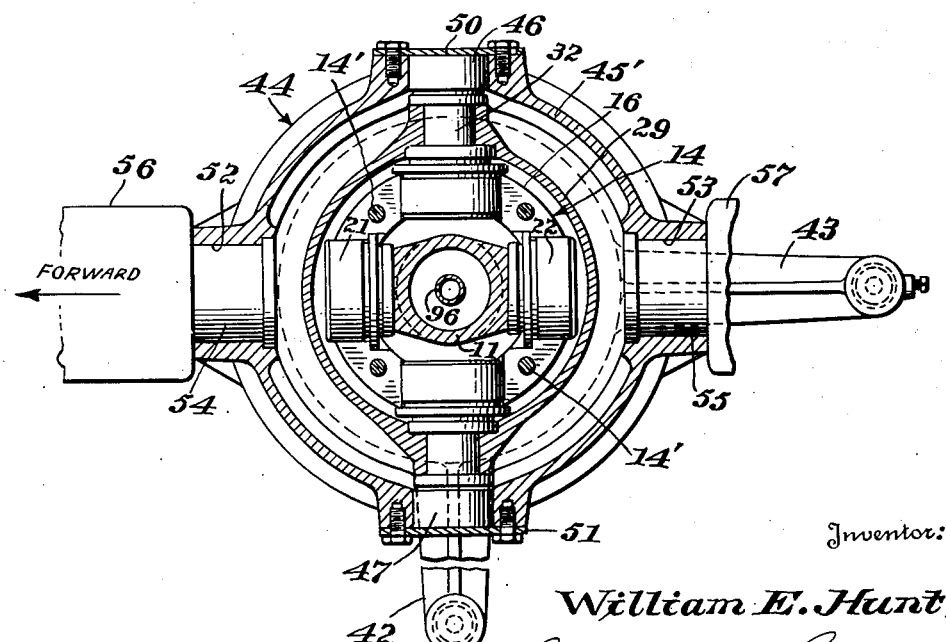
Inventor:
William E. Hunt,
By Cushman Darby & Cushman
Attorneys.

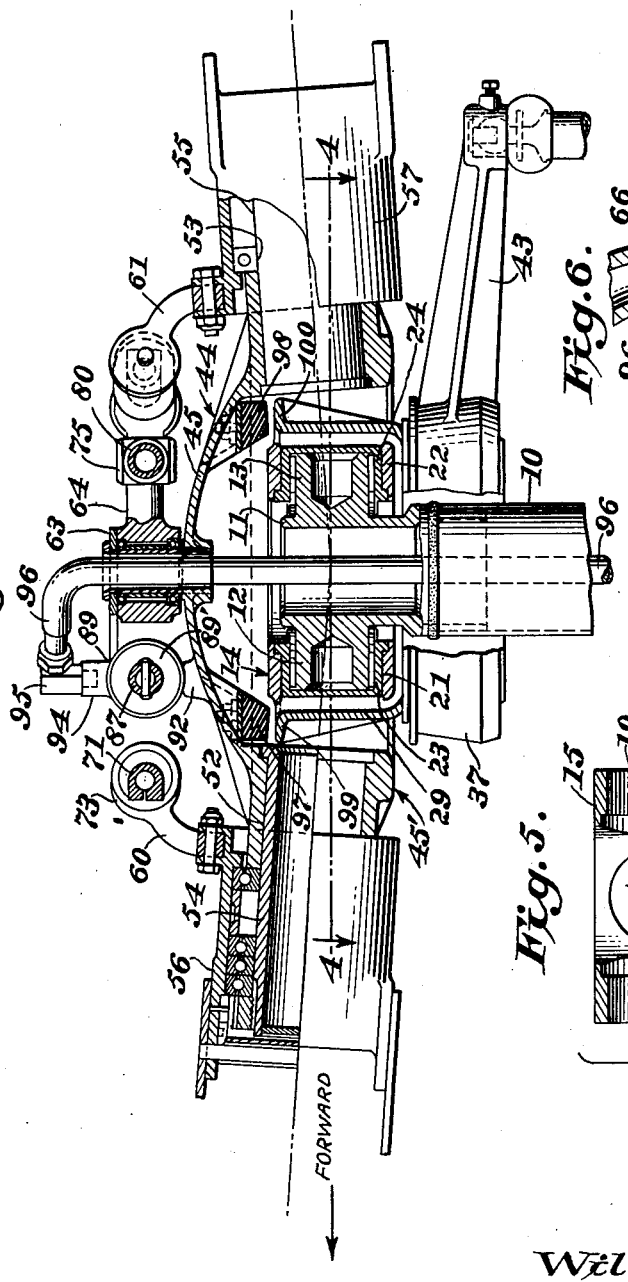

Patented May 26, 1953

2,639,775

UNITED STATES PATENT OFFICE 2,639,775

ROTATIVE WING AIRCRAFT

William E. Hunt, Flushing, N. Y.

Application August 14, 1946, Serial No. 690,511

17 Claims. (Cl. 170—160.27)

This invention relates to rotative wing aircraft structure and in particular to lifting rotor assemblies for such craft, especially helicopters. An object of the invention is to provide a compact universally tiltable hub structure embodying a single flapping axis for one or a pair of supporting wings or blades having a pitch-adjusting axis, or axes, in a plane of the hub axis at 90° to the flapping axis. Another object of the invention is to provide a system of pitch control in which, in the absence of a positive pitch-applying force, minimum pitch is automatically assumed. Subsidiary to these principal objects are a number of others as will appear from the following description of the illustrative embodiment of the invention shown in the accompanying drawings, in which:

Figure 1 is a plan view of a rotor assembly including a pair of wings,

Figure 2 is a section substantially on line 2—2 of Figure 1,

Figure 3 is a section substantially on line 3—3 of Figure 1,

Figure 4 is a section substantially on line 4—4 of Figure 3,

Figure 5 is an exploded view of a gimbal ring which appears in Figures 2 to 4,

Figure 6 shows, on an enlarged scale, certain parts which appear at the top center of Figure 3, and Figure 7 is a partial plan view, on a reduced scale, of a single wing assembly.

In Figures 2 and 3, reference numeral 10 designates a hollow upright drive shaft having fixed to its upper end a hollow fitting 11 which, as most clearly shown in Figure 3, includes diametrically extending trunnions or journal pins 12 and 13. Reference numeral 14 designates an inner gimbal ring which, as most clearly shown in Figure 5, comprises top and bottom portions 15 and 16 provided with opposed half-bearings 17, 18 and 19, 20 which, when the parts 15 and 16 are bolted together, engage bearing cups 21 and 22 between which and the trunnions are disposed rollers 23 and 24.

At right angles to the openings which receive the trunnions 12 and 13, ring 14 is provided with diametrical openings 25 and 26 which receive bearing cups 27 and 28 which are outwardly faced. These openings are defined by semi-cylindrical portions in the two parts of the ring, those for the opening 26 being indicated at 26a and 26b, Figure 5. Ring 14 thus presents rectangularly related pairs of openings with the ring split in a plane which includes the axes of the openings.

Reference numeral 29 designates an outer gimbal ring having diametrically opposed openings 30 and 31 into which are driven, from the inside of the ring, as here shown, journal pins 32 and 33 having enlarged inner portions journaled in the cups 27 and 28 through the intermediary of rollers 34 and 35, the other ends of the pins projecting outwardly of ring 29.

Ring 29 has a concentric depending skirt portion 36 which is embraced by a non-rotating ring 37 and between members 36 and 37 are disposed a pair of ball bearing assemblies 38 and 39, Figure 2. The top of the inner race of assembly 38 abuts a shoulder on the skirt 36 and the bottom of the inner race of assembly 39 is abutted by a retaining ring 40 threaded on the skirt. The bottom of the outer race of assembly 39 abuts a shoulder on ring 37 and the top of the outer race of assembly 28 is engaged by a retaining ring 41 bolted to the top of ring 37. Rectangularly related arms 42 and 43 project from ring 37, one of the arms being in the longitudinal vertical axial plane of the aircraft (not shown).

Reference numeral 44 designates a housing in the form of an inverted bowl, the housing including a domed top wall 45 and a generally cylindrical side wall or skirt 45'. The latter is provided with diametrically opposed openings receiving bearing cups 46 and 47 in which are journalled the outer ends of pins 32 and 33 through the intermediary of rollers 48 and 49, the cups being retained in place by means of cover plates 50 and 51 bolted to the housing side wall.

In an axial plane at right angles to the journal pins 32 and 33, the housing side wall is provided with openings 52 and 53 which receive sleeves 54 and 55. As here shown, the axes of the sleeves are inclined upwardly from the horizontal to provide a slight dihedral and associated with outwardly projecting portions of the sleeves through suitable journal and thrust bearings are the roots 56 and 57 of wings 58 and 59. Fixed to the inner end of root portion 56 at its top is an upwardly projecting arm 60 and an equal arm 61 is fixed to the top inner portion of root portion 57.

The top wall 45 of the housing 44 has a central opening 62, Figures 2, 3 and 6 in which is threaded a nipple 63 having an upwardly projecting portion on which is journalled a cross arm 64, and above the cross arm the nipple is engaged in an opening in a shear plate 65 which is engaged by an out-turned flange 66 at the top of the nipple. The shear plate 65 is supported by pedestals 67 and 68, Figure 2, rising from the top of the housing 44. At equal distances from its center, the cross arm is provided with oppositely laterally directed ball sockets 69 and 70 in which are engaged balls on the ends of equal links 71 and 72 which are adjustable as to length. At their other ends the links have balls engaged in sockets 73 and 74 at the upper end of arms 60 and 61.

Pivoted to cross arm 64 on a vertical axis adjacent socket 70 is a clevis 75 which includes a stem 76 slidable in a ball 77 in a ball socket 78 mounted at the upper end of a pedestal 79 which rises from the housing top, and interposed between the clevis head and an abutment cup 80' is a compression spring 80 which tends to force an abutment portion 81 of the cross arm against a rubber stop 82 on the end of a screw 83 which is threaded in the upper end of a pedestal 84 which rises from the housing top, the screw being lockable in adjusted position by a nut 85, Figure 1.

Pivoted to the cross arm opposite abutment portion 81 is a clevis 86 to which is secured a piston rod 87 in turn secured to a piston 88 in a cylinder 89, the piston rod passing through a packed opening in a cylinder end wall 89'. The other end of the cylinder is closed by a plug 90 into which is threaded a self-aligning rod end bearing 91 which is pivoted between the upper end of a pedestal 92 (Figure 3) and an extension of shear plate 65 on a bolt 93, Figure 1. Cylinder 89 includes an upwardly projecting boss 94, Figure 3, having a radial bore providing an inlet to the cylinder between piston 88 and the end wall 89. An L fitting 95 secured to the boss has connected thereto a flexible tube 96 which is carried over to and downwardly through nipple 63, fitting 11, and shaft 10 to a source of fluid pressure. While the source of pressure may be under manual control, it is preferred that the pressure supply be automatically controlled in dependence on the rotor-driving engine so that pitch is automatically adjusted to maintain a substantially constant speed of rotor rotation, such control systems being well known in the art and requiring no discussion herein.

In any event, the pitch controlling pressure is applied with equal effect to the wings 58 and 59 against the action of spring 80, and upon relief of the pressure, whether purposely or through some failure in the hydraulic system, the spring will immediately return the cross arm to the minimum pitch relation determined by the position of the stop 82, which position will ordinarily be one at which auto-rotation can occur. Using automatic pitch application enables the pilot to direct his entire attention to the other controls so that the operation of the craft is considerably simplified.

By providing a single flapping hinge set at 90° to the vertical plane which includes the pitch-adjusting axes of the wings, the minimum amount of flapping will occur in hovering and in horizontal flight and vibration from this cause is reduced to a minimum. In order to limit the tilting of the wings on the flapping axis, blocks of rubber 97 and 98 may be secured beneath the housing top wall 45, Figure 3, for cooperation with abutment portions 99 and 100 of the outer ring 29. The latter is universally adjustable through arms 42 and 43 for the control of roll and pitch. There is sufficient clearance between the stop blocks 97 and 98 and cooperating abutment portions 99 and 100 to prevent any interference with free flapping action upon tilting of ring 29, the stops being merely intended to prevent excessive drooping to one side or the other when the rotor is at rest.

A feature of considerable simplification is the use of the double journals 32 and 33 which, as here shown, are supported by the outer gimbal ring 29 and provide journal portions both for the inner gimbal ring 14 and for the housing 44. In assembly, the journal pins are successively driven through the openings in ring 29 and into the bearing openings of the housing and then the inner ring 14 may be readily engaged simultaneously with the inner portions of the journal pins and with the trunnions 12 and 13 and the parts secured together by bolts 14'.

The built-in dihedral serves to relieve the loading on both the hub and wings.

In Figure 7 the rotor includes a housing 44' and a single wing 59' projecting therefrom with pitch control means the same as in the first embodiment. Reference numeral 101 designates a streamlined weight fixed to and projecting from the housing diametrically opposite the wing, the weight serving to balance the wing on the single flapping axis.

It will be understood that the disclosure herein is intended to be illustrative and not restrictive and that the invention is susceptible of varied embodiment under the claims which follow.

I claim:

1. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis of said outer ring, and a pair of rotor blades carried by said housing on pitch-adjusting axes which are in an axial plane of said shaft at right angles to the last-mentioned pivotal axis of said housing, whereby the pivotal connection of said housing to said outer ring provides a flapping axis for said blades independent of the pivotal connection of said rings.

2. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on the pivotal axis of the latter, and a pair of rotor blades carried by said housing on pitch-adjusting axes which are in an axial plane of said shaft at right angles to the last-mentioned pivotal axis of said housing.

3. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis, a pair of rotor blades carried by said housing on pitch-adjusting axes which are in an axial plane of said shaft at right angles to the last-mentioned pivotal axis of said housing, said outer ring including a depending cylindrical skirt, a non-rotating ring rotatably receiving said skirt, and pitch and roll controlling arms projecting from said non-rotating ring.

4. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on the pivotal axis of the latter, a pair of rotor blades carried by said housing on pitch-adjusting axes which are in an axial plane of said shaft at right angles to the last-mentioned pivotal axis of said housing, said outer ring including a depending cylindrical skirt, a non-rotating ring rotatably receiving said skirt, and pitch and roll controlling arms projecting from said non-rotating ring.

5. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis, a pair of rotor blades carried by said housing on pitch-adjusting axes which are in an axial plane of said shaft at right angles to the last-mentioned pivotal axis of said housing, equal arms projecting from the blade roots respectively, a cross arm pivoted at its middle point on said housing, equal links connecting the ends of the cross arm to said arms, means connected to said housing and to said cross arm for swinging said cross arm to increase the pitch of the blades, and means connected to said housing and to said cross arm tending during rotation of the structure to swing said cross arm to return the blades to minimum pitch.

6. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring or a diametrical axis, a pair of rotor blades carried by said housing on pitch-adjusting axes which are in an axial plane of said shaft at right angles to the last-mentioned pivotal axis of said housing, equal arms projecting from the blade roots respectively, a cross arm pivoted at its middle point on said housing, equal links connecting the ends of the cross arm to said arms, means connected to said housing and to said cross arm for swinging said cross arm to increase the pitch of the blades, and spring means connected to said housing and to said cross arm tending to swing said cross arm to return the blades to minimum pitch.

7. A rotor assembly for helicopters, comprising a hub including a domed housing pivotal on an axis diametrical to the axis of rotation, a pair of rotor blades carried by said housing on pitch-adjusting axes which are in a plane which includes the axis of rotation and is at right angles to the pivotal axis of said housing, equal arms projecting from the blade roots respectively, a cross arm pivoted at its middle point on said housing, equal links connecting the ends of the cross arm to said arms, means connected to said housing and to said cross arm for swinging said cross arm to increase the pitch of the blades, and means connected to said housing and to said cross arm tending during rotation of the rotor to swing said cross arm to return the blades to minimum pitch.

8. A rotor assembly for helicopters, comprising a hub including a domed housing pivotal on an axis diametrical to the axis of rotation, a pair of rotor blades carried by said housing on pitch-adjusting axes which are in a plane which includes the axis of rotation and is at right angles to the pivotal axis of said housing, equal arms projecting from the blade roots respectively, a cross arm pivoted at its middle point on said housing, equal links connecting the ends of the cross arm to said arms, means connected to said housing and to said cross arm for swinging said cross arm to increase the pitch of the blades, and spring means connected to said housing and to said cross arm tending to swing said cross arm to return the blades to minimum pitch.

9. Rotor hub structure for helicopters, comprising a fitting securable to a rotor drive shaft and having diametrically projecting trunnions, an inner gimbal ring having bearings receiving said trunnions, an outer gimbal ring surrounding the inner ring, diametrical journal pins extending from the inner ring, the outer ring having bearings receiving said pins and beyond which the outer ends of the pins project, the axes of said pins being at right angles to the axis of said trunnions, and a housing having bearings receiving said projecting ends, said housing including means for mounting a pair of rotor blades on fixed-adjusting axes which are in a plane including the axis of rotation of the hub structure and is at right angles to the axis of said pins.

10. Structure according to claim 9 wherein the inner ring is split in a plane normal to its axis and bisecting its bearings.

11. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis of said outer ring, a rotor blade carried by said housing on a pitch-adjusting axis which is in an axial plane of said shaft at right angles to the last-mentioned pivotal axis of said housing, and a balancing member for said blade projecting from the housing at the side opposite from said blade, whereby the pivotal connection of said housing to said outer ring provides a flapping axis for said blade independent of the pivotal connection of said rings.

12. Structure according to claim 11 wherein the balancing member is constituted by a streamlined weight fixed to the housing.

13. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis of said outer ring, and a pair of rotor blades carried by said housing on pitch-adjusting axes which are in an axial plane of said shaft at right angles to the last-mentioned pivotal axis of said housing, the pitch-adjusting axes of said rotor blades being angulated slightly relative to each other, whereby the pivotal connection of said housing to said outer ring provides a flapping axis for said blades independent of the pivotal connection of said rings.

14. Rotor hub structure for helicopters, comprising a fitting securable to a rotor drive shaft and having diametrically projecting trunnions, an inner gimbal ring having bearings receiving said trunnions, an outer gimbal ring surrounding the inner ring, diametrical journal pins extending from the inner ring, the outer ring having bearings receiving said pins and beyond which the outer ends of the pins project, the axes of said pins being at right angles to the axis of said trunnions, and a housing having bearings receiving said projecting ends, said housing including means for mounting a pair of rotor blades on pitch-adjusting axes which are in a plane including the axis of rotation of the hub structure and is at right angles to the axis of said pins, the pitch-adjusting axes of said rotor blades being angulated slightly relative to each other.

15. Helicopter structure comprising a vertical drive shaft, an inner gimbal ring pivotal on the upper end of said shaft on a diametrical axis, an outer gimbal ring pivotal on the inner ring on a diametrical axis at right angles to the first axis, a rigid housing pivotal on the outer ring on a diametrical axis of said outer ring, a pair of rotor blades carried by said housing on pitch-adjusting axes which are in an axial plane of said shaft at right angles to the last-mentioned pivotal axis of said housing, whereby the pivotal connection of said housing to said outer ring provides a flapping axis for said blades independent of the pivotal connection of said rings, and resilient stops carried by said housing in general alignment with said rotor blades and alternately engageable with said outer ring to limit the pivotal movement of said housing relative to said outer gimbal ring.

16. Rotor structure comprising a drive shaft, an inner gimbal ring pivotal on one end of said shaft on a diametrical axis, an outer gimbal ring pivotal on said inner ring on a diametrical axis at right angles to the first axis, a rigid annular member pivotal on the outer ring on a diametrical axis of said outer ring, and at least one rotor blade carried by said member on a pitch adjusting axis which is in an axial plane of said shaft at right angles to the last-mentioned pivotal axis of said member, whereby the pivotal connection of said housing to said outer ring provides a flapping axis for said blade independent of the pivotal connection of said rings.

17. The structure defined in claim 16 in which the rigid annular member comprises a domed housing having a cylindrical skirt enclosing the inner and outer gimbal rings.

WILLIAM E. HUNT.

References Cited in the file of this patent

UNITED STATES PATENTS

| Number | Name | Date |
|---|---|---|
| 1,764,381 | Arbuthnot | June 17, 1930 |
| 1,987,650 | Wiegand | Jan. 15, 1935 |
| 2,216,164 | Schairer | Oct. 1, 1940 |
| 2,247,034 | Pitcairn | June 24, 1941 |
| 2,256,918 | Young | Sept. 23, 1941 |
| 2,261,337 | Campbell | Nov. 4, 1941 |
| 2,263,304 | Larsen | Nov. 18, 1941 |
| 2,264,942 | Larsen | Dec. 2, 1941 |
| 2,336,579 | Venditty et al. | Dec. 14, 1943 |
| 2,376,523 | Synnestvedt | May 22, 1945 |
| 2,457,429 | Young | Dec. 28, 1948 |

FOREIGN PATENTS

| Number | Country | Date |
|---|---|---|
| 34,123 | France | Nov. 20, 1928 |
| | (Addition to No. 631,596) | |
| 793,323 | France | Nov. 16, 1935 |